UNITED STATES PATENT OFFICE.

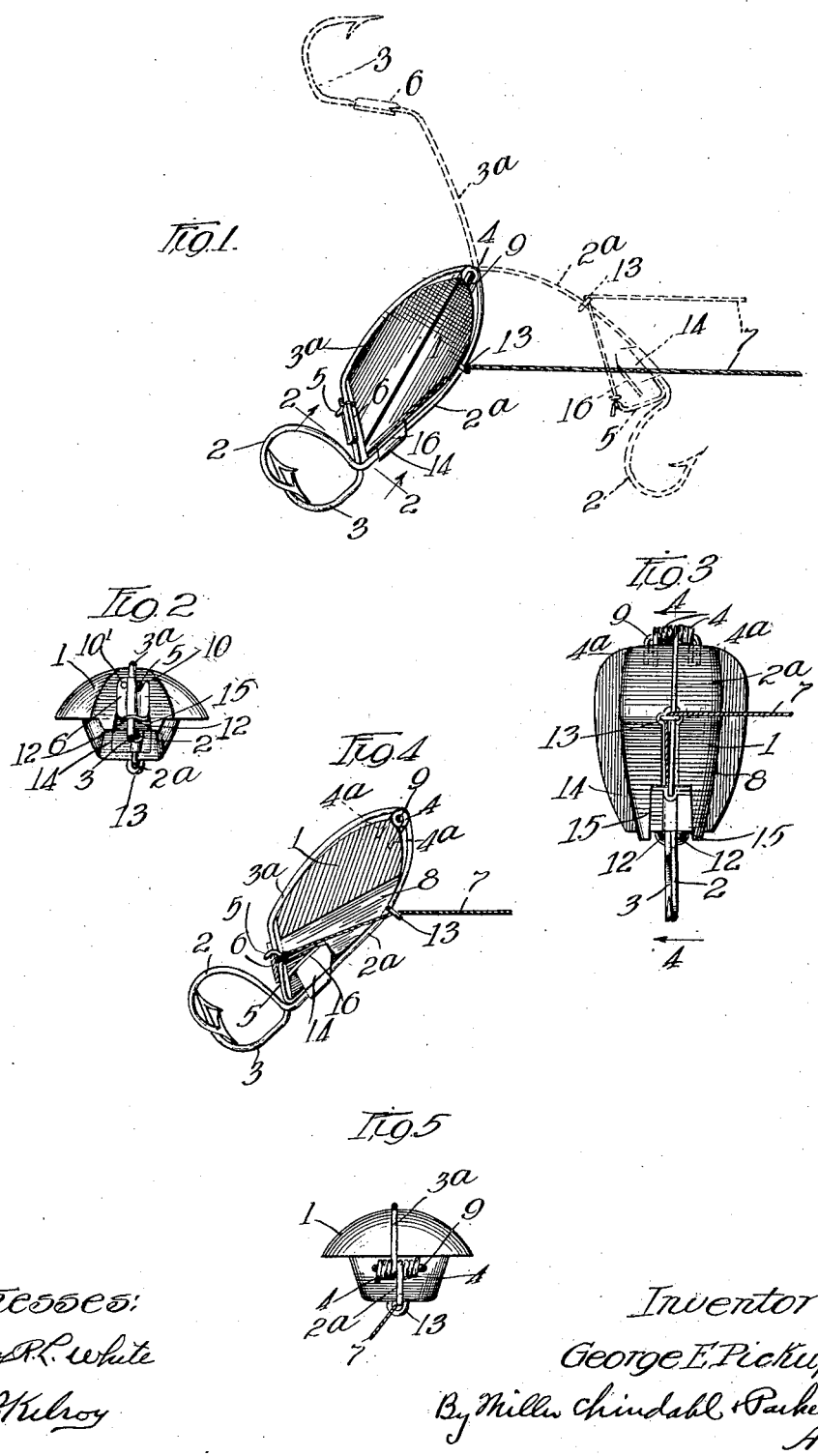

GEORGE E. PICKUP, OF NEWARK, OHIO, ASSIGNOR OF ONE-HALF TO FRED HARLOW AND ONE-HALF TO JOHN STEINBAUGH, BOTH OF NEWARK, OHIO.

FISH-BAIT.

1,346,674.  Specification of Letters Patent.  Patented July 13, 1920.

Application filed January 28, 1918. Serial No. 214,114.

*To all whom it may concern:*

Be it known that I, GEORGE E. PICKUP, a citizen of the United States, residing at Newark, in the county of Licking and State of Ohio, have invented certain new and useful Improvements in Fish-Baits, of which the following is a specification.

The invention relates to fish baits of the spreading hook type, and the general object of the invention is to provide a fish bait of a very practical character.

More specifically, one of the objects of my invention is to provide a fish bait of the character indicated in which the hooks may be very easily set or locked together in position to be sprung.

A further object of the invention is to provide an automatic latch for the hooks which may be readily released for the spreading operation but at the same time will not be accidentally released.

A still further object of the invention is to provide an improved surface casting bait having spreading hooks.

Another and important object of the invention is to provide a fish bait in which the hooks are arranged in such manner as to be absolutely weedless.

The objects of the invention thus generally stated, together with other and ancillary advantages, are attained by the construction and arrangement illustrated in the accompanying drawings forming part hereof, in which Figure 1 is a side elevation of a bait embodying my invention with the hooks locked together or set, the position of the hooks when sprung being shown in dotted lines. Fig. 2 is a transverse section on line 2—2 of Fig. 1. Fig. 3 is an under side elevation showing the hooks set. Fig. 4 is a central sectional view on line 4—4 of Fig. 3. Fig. 5 is a front end view showing the manner of anchoring the springs for spreading the hooks.

The bait comprises a body 1, a pair of hooks 2 and 3 having arms 2ª and 3ª, a coiled spring 4 on the end of each arm and anchored in the forward end of the body, and a latch for locking the hooks together comprising a latch member 5 on one hook and a latch plate 6 on the other, the operating line 7 being fastened to the latch member and arranged to release said member from the latch plate when the bait body is seized and pulled by a fish.

The bait is herein shown as of the surface casting type, and for this purpose the body 1, which may be made of wood, is formed of substantial width and is suitably shaped so that in operation it will ride upon the surface of the water after the fashion of a live bait. A groove 8 is provided in the rear end of the body and extends forwardly in the under side thereof to afford a passage for the operating connections.

The hooks 2 and 3, which are made relatively rigid and may be provided with the usual barbs, are preferably formed integral with their arms 2ª and 3ª, and said arms are preferably formed by extending one end of the springs 4 rearwardly upon the body 1. The opposite ends 4ª of the springs 4 are anchored in the forward end of the body 1, and the spring is coiled on a staple 9 entered into the body. The hooks 2 and 3 are so mounted with reference to each other upon their arms 2ª and 3ª that they extend in the direction of movement of the hooks when released, and when they are locked together they overlap or cross so as to substantially form a circle with the free ends of the hooks lying within the periphery thereof. It will thus be apparent that when the bait is drawn through the water with the hooks locked, the ends of the hooks will be wholly protected one by the other and thus will not engage with any substance in the water so as to cause a release of the latch or will not catch any weeds or the like so as to interfere with the fishing operation.

Preferably the latch member 5 is soldered or otherwise secured upon the shank of the hook 2 and the latch plate 6 is mounted on the shank of the hook 3. The latch member is in the form of a spring arm having its free end bent to form a hook to which the line 7 is fastened and also arranged to spring into engagement with an aperture in the latch plate, such as a notch 10 or opening 10'. Said plate may also be soldered to the shank of the hook 3 and is arranged transversely thereof with the notch 10 or opening 10' at its forward end, one on either side of the shank of the hook. By this construction, when the hooks are swung toward each other against the action of their springs 4, the latch member slidably engages with the forward under surface of the latch plate and rides into locking engagement therewith. In this position of the parts the end of the latch member engages either with the notch 10 or in the opening 10' depending upon whether the hook 2 which carries the latch member is on one side or the other of the hook 3 carrying the latch-plate, the latch member being shown in the drawings as engaging with the notch 10. Preferably the latch plate is bent on its central longitudinal line in order to form with the shank of the hook 3 a guide groove 12 in its under surface upon each side of said shank, so that the end of the latch member will be readily guided into engagement with the aperture 10—10' when the hooks are brought together into inoperative or locked position. The hook 2 is also provided on its arm 2ª with an eye 13 through which the line 7 is passed for guidance, the eye being soldered or otherwise secured to the arm at a point substantially midway between its ends so that when the hooks are locked together the eye will be positioned substantially centrally of the under surface of the body 1, and in order to cause the bait to assume the desired position when it is drawn along the surface of the water, a ballast 14 is provided therefor. Such ballast is mounted on the hook 2, being soldered or otherwise secured to the arm 2ª in such position that when the hooks are locked together the ballast will lie within a groove 15 provided in the under surface of the body at the rear end thereof, the groove being formed by enlarging the rear end of the groove 8 at each side thereof.

As shown in Fig. 4, the line 7 which is fastened to the latch member 5 freely passes through the groove 8 and the eye 13, so that when a fish seizes the bait, the line being held taut, the latch member 5 will be drawn out of engagement with the latch plate 6, the line being guided in its movement with reference to the bait by the eye 13 so that the line will exert a direct pull on the latch member 5 irrespective of the position in which the bait is held by the fish. Thereupon the hooks, impelled by their springs 4, immediately spring outwardly so as to engage and hold the fish. Preferably the ballast is so positioned with reference to the latch member that when said member is released its releasing movement is limited by the ballast. Herein I have shown a plate 16 on the inner surface of the ballast which is arranged to be engaged by the latch member for this purpose.

It will be understood that certain features of the invention are applicable to other types of baits than the surface casting type.

I claim as my invention:

1. In combination with a line, a fish bait including a body, a pair of hooks mounted on opposite sides of the body and normally tending to swing outwardly therefrom, a latch for releasably locking said hooks together operatively connected to said line and including a spring member fixed on one of said hooks and adapted to be released by the relative movement of the bait and line, and means for guiding the line in its movements with reference to the body whereby a direct pull is exerted on the latch in any position of the body.

2. In combination with a line, a fish bait comprising a body, a pair of hooks mounted on opposite sides of the body so as to normally swing outwardly therefrom, a latch for releasably locking said hooks together including a pair of members, one member fixed upon the arm of each hook spaced from its pivotal base toward its barbed extremity and adapted to automatically engage with each other when the hooks are brought together, one of said members being connected to said line for movement therewith relative to the bait body.

3. In combination with a line, a fish bait comprising a body, a pair of hooks each having an arm hinged at one end of the body and normally tending to swing outwardly away from the body, a latch plate on one hook and a latch member on the other hook adapted to spring into engagement with said plate when the hooks are swung together, there being a groove in the body through which said line may be passed and fastened to said latch member whereby to release it, and one of said arms having an eye thereon for guiding the line in its movement in said groove.

4. In combination with a line, a fish bait comprising a body, a pair of hooks mounted on opposite sides of the body and normally tending to swing outwardly therefrom, a latch plate on one hook having an aperture therein, and a latch member on the other hook having a bent end adapted to spring into engagement with said aperture in the plate when the hooks are swung together, said bent end of the latch member being connected to said line for movement therewith relative to the bait body.

5. In combination with a line, a surface-casting fish bait comprising a body of substantial width, a pair of spreading hooks on said body, means for releasably locking said hooks together, said means comprising a spring member fixed on one of said hooks and connected to said line so as to be releasable by the relative movement thereof to the bait body, means positioned substantially midway between the ends of the body at the under surface thereof when the hooks are locked together for guiding the line and positioning it with reference to the body, and a ballast for the body positioned below said guiding means.

6. In combination with a line, a fish bait comprising a body having spreading hooks pivoted at one end thereof, means releasably locking said hooks together at the opposite end of the body including an element fixed on one of said hooks between its pivotal base and barbed extremity and connected to said line for movement thereby to effect a release of the hooks, and a member arranged to limit the movement of said element.

7. A fish bait having, in combination, a body, a pair of spreading hooks on said body, and a latch for releasably locking said hooks in inoperative position, said latch being arranged to act automatically to lock the hooks together as they are swung into their inoperative position.

8. In combination with a line, a fish bait comprising a pair of spreading hooks, a latch for releasably locking said hooks together including a yieldable member fixed on one hook between the base and the point of said hook and a rigid member similarly positioned on the other hook, said yieldable member being operatively connected to said line, and means on one of the hooks for guiding the line.

9. A fish bait having, in combination, a pair of spreading hooks, a latch plate on one hook having an aperture therein, a releasable latch member on the other hook, said plate being fixed upon its hook and bent so as to form together with the hook a guide groove to guide the free end of the latch member into said aperture when the hooks are swung together.

10. A fish bait having, in combination, a pair of spreading hooks each having an arm formed integral therewith and each arm having a coiled spring on its end, and a latch for releasably locking the hooks together comprising a latch member soldered on one hook and a latch plate soldered on the other hook and arranged to be engaged by said latch member.

In testimony whereof, I have hereunto set my hand.

GEORGE E. PICKUP.